(12) United States Patent
Shook et al.

(10) Patent No.: US 9,633,141 B2
(45) Date of Patent: Apr. 25, 2017

(54) SYSTEMS AND METHODS FOR ELECTRONIC STRESS ANALYSIS COMPARISON

(71) Applicant: FLUOR TECHNOLOGIES CORPORATION, Aliso Viejo, CA (US)

(72) Inventors: Daniel Shook, Sugar Land, TX (US); Mark Thompson, Sugar Land, TX (US)

(73) Assignee: Fluor Technologies Corporation, Sugar Land, TX (US)

(*) Notice: Subject to any disclaimer, the term of this patent is extended or adjusted under 35 U.S.C. 154(b) by 1006 days.

(21) Appl. No.: 13/891,087

(22) Filed: May 9, 2013

(65) Prior Publication Data

US 2014/0336991 A1    Nov. 13, 2014

(51) Int. Cl.
*G06F 17/50* (2006.01)
(52) U.S. Cl.
CPC .......... *G06F 17/50* (2013.01); *G06F 17/5009* (2013.01); *G06F 2217/34* (2013.01)
(58) Field of Classification Search
None
See application file for complete search history.

(56) References Cited

U.S. PATENT DOCUMENTS

| | | | |
|---|---|---|---|
| 4,181,954 A | 1/1980 | Rosenthal et al. | |
| 5,227,983 A * | 7/1993 | Cox | G06F 17/509 434/72 |
| 5,517,428 A * | 5/1996 | Williams | G06F 17/509 700/83 |
| 5,557,537 A * | 9/1996 | Normann | G06F 17/509 434/72 |
| 7,624,002 B2 * | 11/2009 | Berwanger | G06F 17/50 703/6 |
| 8,825,453 B2 * | 9/2014 | Shook | G06F 17/509 703/1 |
| 2007/0083398 A1 * | 4/2007 | Ivey | G06Q 40/08 705/4 |

FOREIGN PATENT DOCUMENTS

| | | |
|---|---|---|
| JP | 06079318 | 10/1994 |
| JP | 06309393 | 11/1994 |
| JP | 07121599 | 5/1995 |
| JP | 07141405 | 6/1995 |
| JP | 2004240684 | 8/2004 |

* cited by examiner

*Primary Examiner* — Omar Fernandez Rivas
*Assistant Examiner* — Nithya J Moll
(74) *Attorney, Agent, or Firm* — Conley Rose, P.C.; Kristin Jordan Harkins (57) ABSTRACT

Electronic comparison methods are described for determining changes in a current design model with respect to an earlier model and analyzing the impact of the identified changes. The method includes associating a priority value with a set of modified component objects using one or more algorithms and presenting a subset of the set of component objects, each of which has a priority value greater than a threshold value.

11 Claims, 5 Drawing Sheets

SYSTEMS AND METHODS FOR ELECTRONIC STRESS ANALYSIS COMPARISON

FIELD OF THE INVENTION

The field of the invention is electronic stress analysis and comparison systems and methods.

BACKGROUND

The following background discussion includes information that may be useful in understanding the present invention. It is not an admission that any of the information provided herein is prior art or relevant to the presently claimed invention, or that any publication specifically or implicitly referenced is prior art.

The use of software such as computer-aided design programs is widespread, particularly in the field of designing of large-scale plants and related systems. During the design phase, it is desirable to account for the lifecycle of the plant with the goal to enhanced performance of the plant or system.

In addition, during a design phase, many thousands of changes may be made to a design, some of which were intentional, and others that occur as a result of changes to other components. For example, shifting a location of an absorber will cause changes to the conduits leading to and from the absorber. Because of the many changes that occur during the design phase, there is a need to not only easily identify changes made to design parameters pertaining to any section of the system so that its impact and importance (both on the particular section as well as on the entire system) can be easily ascertained, but also filter the changes to present only those changes deemed to be important to a user.

It is known to verify compatibility of revised design and display design change information to a user. See, e.g., Japanese patent publ. no. 07-121599 of Hitachi Ltd., published on May 12, 1995, and WIPO publ. no. 2011/095980 published on Aug. 11, 2011. In addition, Japanese pat. publ. no. 2004/240684 of Hitachi Ltd., published on Aug. 26, 2004, discusses improving efficiencies of piping design by analyzing the design using a thermal stress analysis to determine the design's feasibility. Japanese pat. publ. no. 07-141405 of Hitachi Ltd., published on Aug. 26, 2004, discusses how changes in piping design can affect stress analysis of the piping design.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Although automatic identification of changes in a design is generally known, there exists a need to analyze and filter the identified changes for a user.

SUMMARY OF THE INVENTION

The inventive subject matter provides apparatus, systems and methods in which one can electronically identify changes between first and second piping models. Preferred methods include the step of providing access to a comparison engine configured to receive the first and second piping models, which may comprise a plurality of component objects. The method further includes comparing parameters of each of the plurality of component objects in the second piping model with parameters of the plurality of component objects in the first piping model using the comparison engine to identify a set of component objects in the second piping model each having at least one modified parameter.

Each of the modified parameters can be analyzed using an analysis engine coupled to a database of stored parameter ranges for a plurality of stored component objects. The analysis engine is preferably configured to (a) match each component object of the set of component objects with a stored component object, (b) compare the modified parameters of that component object with the one or more stored parameter ranges of the matched stored component object for each component object of the set of component objects, and (c) associate a priority value with each of the set of component objects using one or more algorithms as a function of the difference between the modified parameter and the stored parameter range. Rather than require a user to review every change identified between the first and second piping models, the interface can advantageously be configured to only present a subset of the set of component objects that each has a priority value greater than a threshold value. In this manner, the method can be used to automatically filter the changes to only bring important or major changes to a user's attention based on a user's desired priority threshold.

Contemplated systems can include a controller device for electronically identifying changes between first and second piping models. The controller device is preferably configured to receive first and second piping models that each includes a plurality of component objects. The system can further include a comparison engine that is configured to receive the first and second piping models and identify a set of component objects in the second piping model that each has at least one modified parameter. Alternatively, it is contemplated that the controller device could be configured to have such functionality.

The comparison engine can identify component objects by comparing parameters of component objects in the second piping model with parameters of component objects in the first piping model. An analysis engine can be used to analyze each of the modified parameters with respect to parameter ranges stored in a database for a plurality of stored component objects. The analysis engine is preferably configured to also (a) match component objects with a stored component object, (b) compare modified parameters of each modified component object with the one or more stored parameter ranges of the matched stored component object, and (c) associate a priority value with each component object using one or more algorithms as a function of the difference between the modified parameter and the stored parameter range.

A subset of the component objects can then be presented on an interface configured by the controller device or other component of system. The chosen subset includes those component objects having a priority value greater than a threshold value, which may or may not be defined by a user. In this manner, the system can filter the component objects presented to only those objects that require review by the user.

Various objects, features, aspects and advantages of the inventive subject matter will become more apparent from the following detailed description of preferred embodiments, along with the accompanying drawing figures in which like numerals represent like components.

It may be noted that to the extent possible, like reference numerals have been used to represent like elements in the drawings. Further, skilled artisans will appreciate that elements in the drawings are illustrated for simplicity and may not have been necessarily been drawn to scale. For example, the dimensions of some of the elements in the drawings may be exaggerated relative to other elements to help to improve understanding of aspects of the present invention. Furthermore, the one or more elements may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

It should be noted that while the following description is drawn to a computer/server based analysis system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including the ability to quickly apprise a user of important changes made to a plant model.

The following discussion provides many example embodiments of the inventive subject matter. Although each embodiment represents a single combination of inventive elements, the inventive subject matter is considered to include all possible combinations of the disclosed elements. Thus if one embodiment comprises elements A. B, and C, and a second embodiment comprises elements B and D, then the inventive subject matter is also considered to include other remaining combinations of A. B, C, or D, even if not explicitly disclosed.

Figure 1:
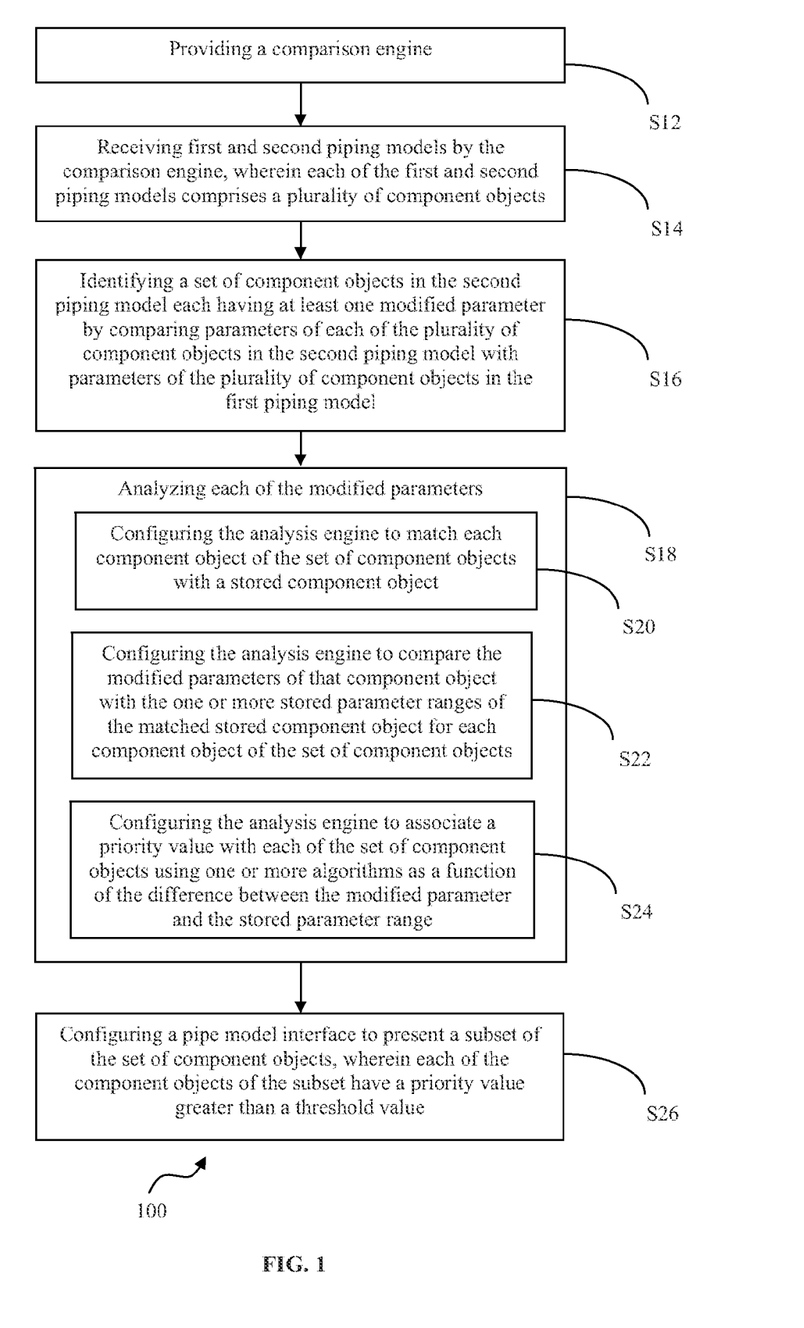
FIGS. 1-3 are flowcharts of various embodiments of methods for electronically identifying changes between first and second piping models.

In FIG. 1, an embodiment of a method for electronically identifying changes between first and second piping models is described. The method 100 includes the step of providing access to a comparison engine S12 that is configured to receive the first and second piping models S14, which may each comprise a plurality of component objects.

In step S16, parameters of each of the plurality of component objects in the second piping model can be compared with parameters of the plurality of component objects in the first piping model using the comparison engine to identify a set of component objects in the second piping model that each has at least one modified parameter. The set of component objects can be analyzed in step S18 using an analysis engine coupled to a database of stored parameter ranges for a plurality of stored component objects, which can include (a) matching each component object of the set of component objects with a stored component object S20, (b) comparing the modified parameters of that component object with the one or more stored parameter ranges of the matched stored component object for each component object of the set of component objects S22, and (c) associating a priority value with each of the set of component objects using one or more algorithms as a function of the difference between the modified parameter and the stored parameter range S24.

Based on the results of the analysis engine, a pipe model interface can be configured in step S26 to present a subset of the set of component objects, wherein each component objects of the subset has a priority value greater than a threshold value. It is contemplated that the threshold value could be set by a user.

For the purpose of illustration, Table 1 below provides overly simplified piping models. For example, the first piping model can include three component objects, namely Component Object 1, Component Object 2 and Component Object 3. Each of the component objects can include one or more parameters. Component Object 1 has two parameters, Parameter 1 and Parameter 2, Component Object 2 has one parameter, Parameter 3, and Component Object 3 has two parameters, Parameter 4 and Parameter 5.

TABLE 1

| First Piping Model | Second Piping Model | Stored Piping Model |
|---|---|---|
| Component Object 1 | Component Object 1 | Component Object 1 |
| Parameter 1 - Value V1 | Parameter 1 - Value V2 | Parameter 1 - Range R |
| Parameter 2 - Value V1 | Parameter 2 - Value V2 | Parameter 2 - Range R |
| Component Object 2 | Component Object 2 | Component Object 2 |
| Parameter - Value V1 | Parameter - Value V2 | Parameter - Range R |
| Component Object 3 | Component Object 3 | Component Object 3 |
| Parameter 4 - Value V1 | Parameter 4 - Value V2 | Parameter 4 - Range R |
| Parameter 5 - Value V1 | Parameter 5 - Value V2 | Parameter 5 - Range R |
| | | Component Object 4 |
| | | Parameter 6 - Range R |
| | | Component Object 5 |
| | | Parameter 1 - Range R |

Each of the parameters (i.e. Parameters 1 to 5) has an associated value (e.g., Value V1). Although Table 1 indicates that all of the Parameters to have Value V1, it is not necessary that they have identical values.

It can be further observed from Table 1 that the second piping model may also include Component Objects 1-3, which in turn may be characterized by the same parameters (i.e. Parameters 1 to 5). Of course, the second piping model may alternatively include additional or different component objects than that found in the first piping model. In the second piping model, values associated with the parameters of the component objects may be different from the corresponding values associated with the first piping model. Thus, referring to Table 1, any of "Value V2" given to a particular parameter in the second piping model can be different from "Value V1" given to a particular parameter in the second piping model.

The various parameters of each component object in the second piping model can be compared in step S16 with corresponding parameters of component objects of the first piping model to identify a set of component objects in the second piping model that each has one or more modified parameters. Using Table 1 above, for example, the following set of component objects can be identified: Component Objects 1 and 3. For Component Object 1, the value of Parameter 1 in the second piping model is different from the first piping model, and the value of Parameter 2 remains the same. For Component Object 2, the value of Parameter 3 in the second piping model is equal to the first piping model. For Component Object 3, the values of Parameters 4-5 in the second piping model are different from the first piping model.

Once the set of component objects is identified, each of the modified parameters of the component objects in the set are analyzed in step S18. In some contemplated embodiments, the analysis can include matching each component object of the set in step S20 with a related component object stored in a database of component objects, each of which has one or more parameters with an associated range of values.

Once a match is found, the modified parameters of that component object are compared in step S22 with the one or more stored parameter ranges of the matched stored component object. Thereafter, a priority value for the component object is assigned in step S24. It is preferred that the priority value is assigned as a function of the difference between the modified parameter and the stored parameter range. However, the priority value could be based on other factors, including for example, a type or category of the component object, an importance of the component object, and a comparison with a historical object. This process (i.e. steps S20 to S24) is repeated for each component object of the set until each component object is assigned a priority value.

Thus, for example, referring to Table 1 the database may include five stored component objects, each of which has a range R, which most likely will vary depending on the stored parameter and component object. Component Object 1 of the second piping model can be compared with all the stored component objects to find a match. Once a match is found, the parameters of Component Object 1 are compared with the associated ranges of the stored parameters. Based at least partly on this comparison, a priority value is assigned to Component Object 1.

It is contemplated that a particular parameter may be stored in the database having characteristics of more than one component object, in which case, the range associated with the parameter may vary, depending upon the component object under consideration. For example, in Table 1. Parameter 1 is stored in the database as being related to Component Object 1 and 5, in which case, the stored ranges for Parameter 1 can vary depending on the associated component object.

Because of the potentially large number of component objects having one or more modified parameters, especially in conjunction with a plant design, the component objects of the set can be filtered by their priority value or other associated values to reduce the number of component objects to be reviewed and presented to the user. For example, a subset of component objects to be presented can be created by comparing the priority value of each component object with a threshold value. If the priority value assigned to a particular component object is equal to or greater than the threshold value, the same may be included in the subset. It is contemplated that the threshold value could be, for example, a value chosen by the user, a value derived from industry practices, or based on historical data. It is further contemplated that the threshold value could vary depending on the type or category of component, for example. Alternatively, the priority value could be at least partially based on the type or category of component, and thereby build in that data into the determined priority value of a component object.

A pipe model interface can be presented to present the subset of the set of component objects in step S26, where each component object of the subset has a priority value greater than the threshold value.

Figure 2:
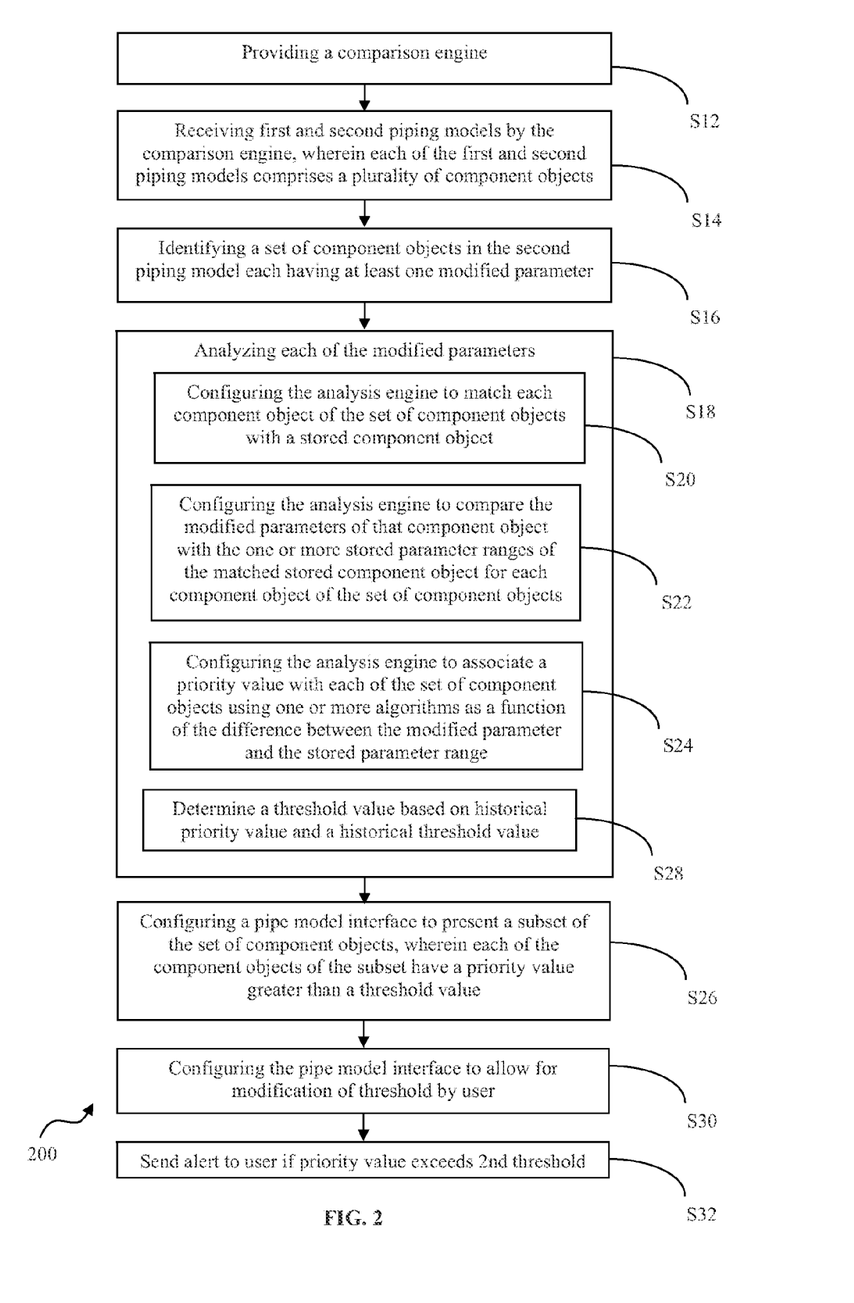

FIG. 2 illustrates another embodiment of a method 200 for electronically identifying changes between first and second piping models. As shown in FIG. 2, a threshold value can be determined in step S28 as a function of at least one of a historical priority value associated with the historical component object and a historical threshold value stored in a historical model database. Alternatively the user can be allowed to input the threshold value or modify the determined threshold value (step S30). It is further contemplated that multiple threshold values could be defined. For example, a first threshold value can be used as described above while the second threshold value could be used for administrative purposes, such as sending alerts to a user if a priority value exceeds the second threshold value (step S32). This could help quickly identify critical changes to a piping model that may substantially impact the model and therefore require higher-level review, for example. With respect to the remaining numerals in FIG. 2, the same considerations for like components with like numerals of FIG. 1 apply.

Figure 3:
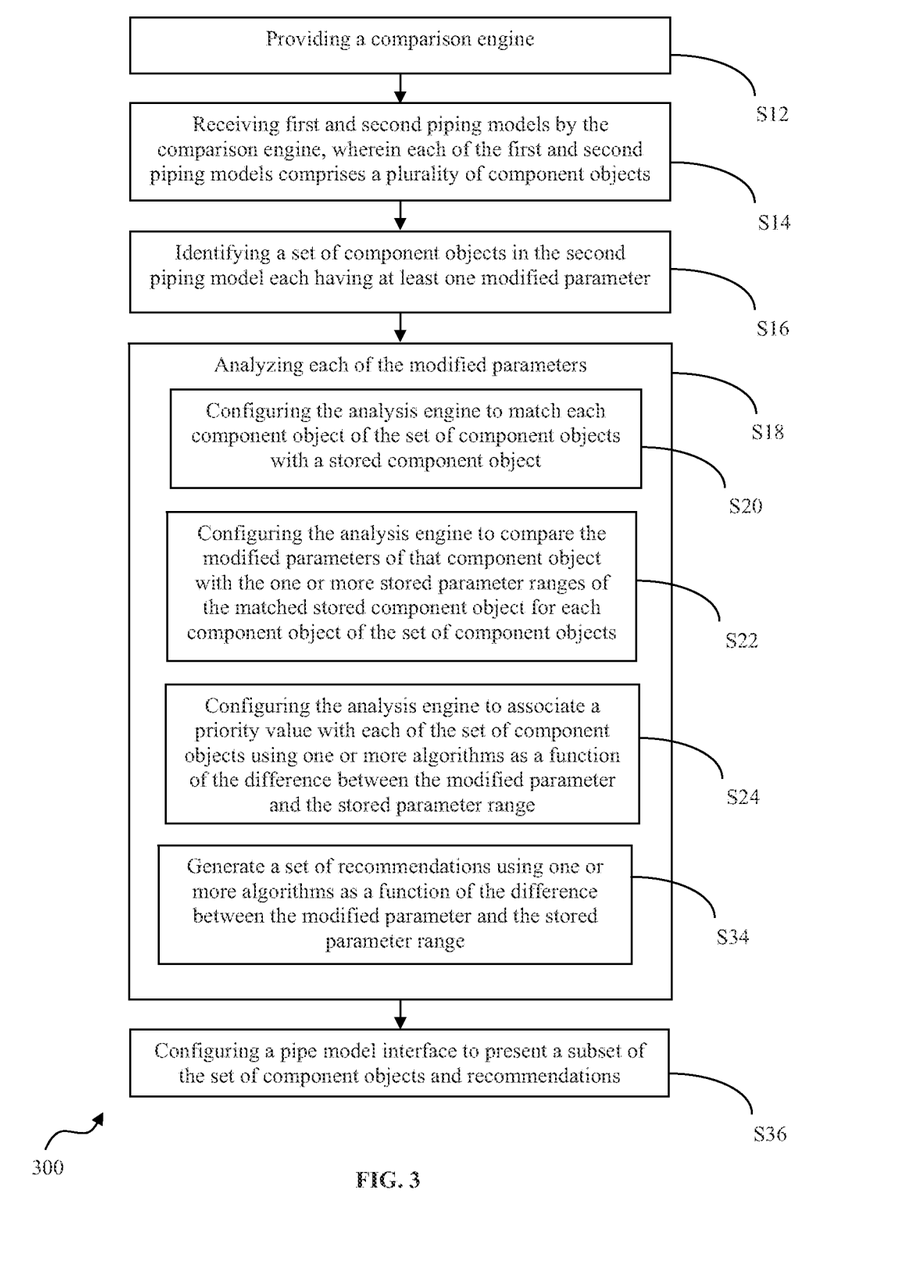

FIG. 3 illustrates another embodiment of a method 300 for electronically identifying changes between first and second piping models, in which a set of recommendations can be generated using one or more algorithms. Such recommendations can be presented in step S36 to the user along with the subset of the set of the component objects. The recommendation may, by way of example, recommend modifications to be made to the piping model or changes to be discarded. In some contemplated embodiments, the recommendations could be determined as a function of the difference between the modified parameter and the stored parameter range (step S34). Alternatively, recommendations could be at least partially based on historical data, such as that stored in the database. With respect to the remaining numerals in FIG. 3, the same considerations for like components with like numerals of FIG. 1 apply.

Figure 4:
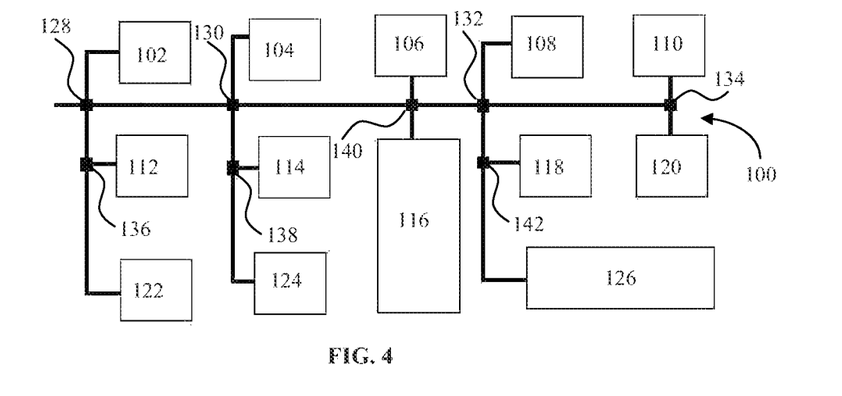
FIG. 4 is a schematic of a first piping model.
Figure 5:
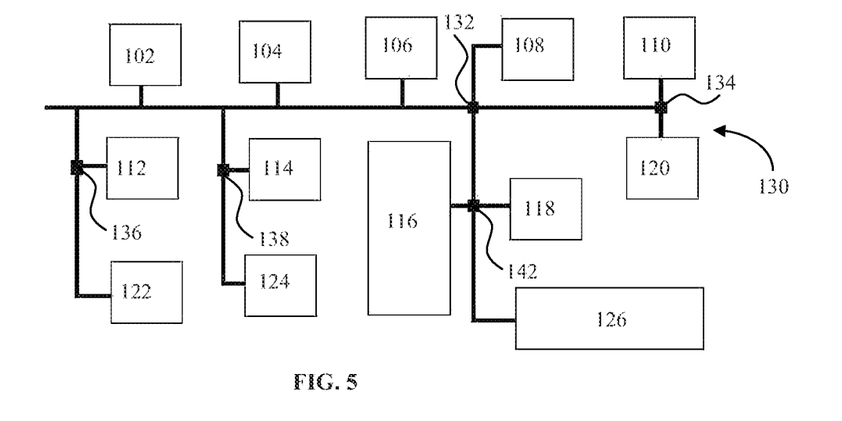
FIG. 5 is a schematic of a second piping model containing modifications as compared to the first piping model of FIG. 4.

In FIG. 4, an exemplary graphical representation of a first piping model having a plurality of components (numbered as 102 to 142). Each of the components is associated with a component object having certain parameters, and can include, for example, pipes, bends, flanges, valves, tees, pressure cases, temperature cases, header, and so forth. FIG. 5 illustrates an exemplary graphical representation of a second piping model also having a plurality of components (numbered as 102 to 142). It can be observed that the second piping model of FIG. 5 has various modifications when compared with the first piping model of FIG. 4. However, based on a visual comparison of the first and second piping models, a user likely cannot immediately ascertain which modifications are likely to have a substantial impact on the design.

Figure 6:
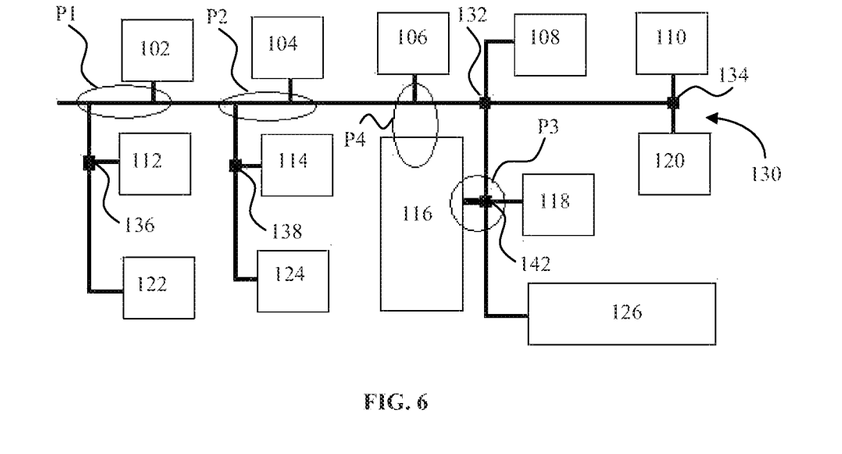
FIG. 6 is one embodiment of an interface identifying changes between the first and second piping models of FIGS. 4-5.

FIG. 6 illustrates another graphical representation of the second piping model in which the subset of the component objects (those component objects having a priority value greater than the threshold value) is presented as a graphical overlay on the second piping model (shown as P1-P4). Additionally or alternatively, the graphical overlay may visually distinguish the component objects of the subset having a higher priority value from those component objects having a lower priority value. This could be, for example, by color, emphasis, size, etc. Rather than an overlay, it is contemplated that the subset could be presented in alternative forms, such as a list, which could then be sorted as desired by a user. With respect to the remaining numerals in FIG. 6, the same considerations for like components with like numerals of FIG. 4 apply.

Figure 7:
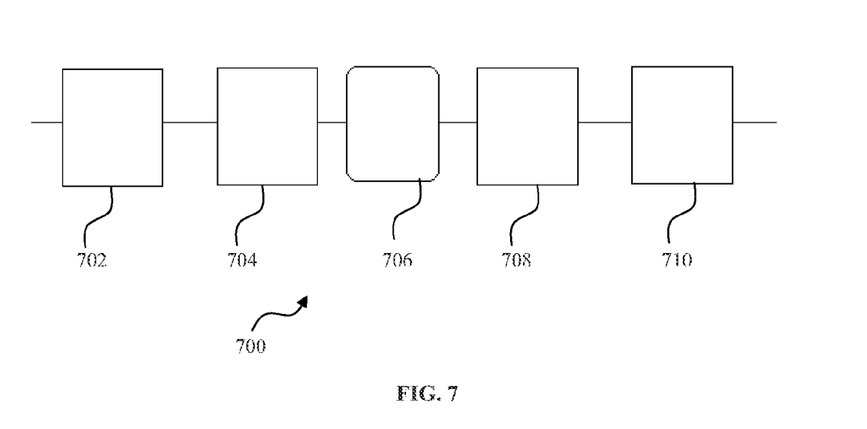
FIG. 7 is a block diagram of an embodiment of a controller device configured to electronically identify changes between first and second piping models.

In FIG. 7, an embodiment of a controller device 700, which is configured to electronically identify changes in first and second piping models. The controller device 700 comprises an interface 702 configured to receive first and second piping models that each includes a set of component objects. The controller device 700 further includes a comparison engine 704 configured to receive the first and second piping models and identify a set of component objects in the second piping model having at least one modified parameter.

As described in detail above, identification of the set of component objects in the second piping model can be based on a comparison of parameters of each component object of the second piping model with parameters of the component objects of the first piping model. The controller device 700 can further includes a database 706 containing stored parameter ranges associated with a plurality of stored component objects.

The controller device 700 can further include an analysis engine 708 coupled to the database 706 and the comparison engine 704, which is capable of analyzing each of the modified parameters with respect to the stored parameter ranges for a plurality of stored component objects. The analysis engine 708 can be configured to (a) match each component object of the set of component objects with a stored component object, (b) compare the modified parameters of that component object with the one or more stored parameter ranges of the matched stored component object for each component object of the set of component objects, and (c) associate a priority value with each of the set of component objects using one or more algorithms as a function of the difference between the modified parameter and the stored parameter range.

A model interface 710 can be configured to present a subset of the set of component objects to a user, where each component object has a priority value greater than a threshold value.

Figure 8:
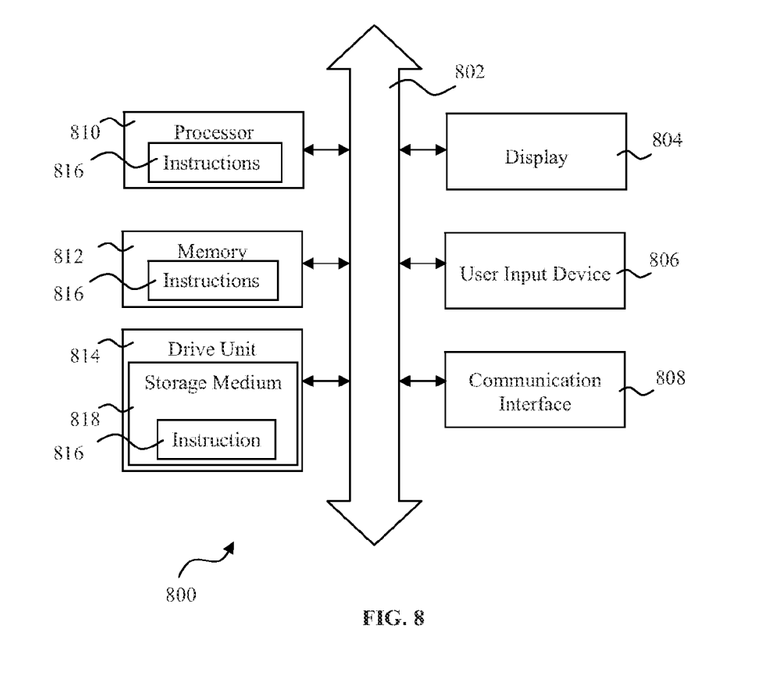
FIG. 8 is a diagram of an embodiment of a computer system configured to electronically identify changes between first and second piping models.

FIG. 8 illustrates an exemplary hardware configuration of the controller device or the various engines and interfaces described above. The hardware 800 may include a processor 810, e.g., a central processing unit (CPU), a graphics processing unit (GPU), or both. The processor 810 may be a component in a variety of other components. For example, the processor 810 may be part of a standard personal computer or a workstation. The processor 810 may be one or more general processors, digital signal processors, application specific integrated circuits, field programmable gate arrays, servers, networks, digital circuits, analog circuits, combinations thereof, or other now known or later developed devices for analyzing and processing data. The processor 810 may implement a software program, such as code (i.e., programmed).

The processor may include instructions 816 hardwired into it which may include various devices, components, circuits, gates, circuit boards, and the like that are operable, directed, or otherwise controlled during the performance of the processor 810.

The hardware 800 may include memory 812, which can communicate via a bus 802. The memory 812 may be a main memory, a static memory, or a dynamic memory. The memory 812 may include, for example, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 812 includes a cache or random access memory for the processor 810. In alternative examples, the memory 812 is separate from the processor 810, such as a cache memory of a processor, the system memory, or other memory. The memory 812 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 812 is operable to store instructions 816 executable by the processor 810. The functions, acts or tasks illustrated in the figures or described may be performed by the programmed processor 810 executing the instructions 816 stored in the memory 812. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown in FIG. 8, hardware 800 may or may not include a display unit 804, such as a liquid crystal display (LCD), an organic light emitting diode (OLED), a flat panel display, a solid state display, a cathode ray tube (CRT), a projector, a printer or other now known or later developed display device for outputting determined information. The display 804 may act as an interface for the user to see the functioning of the processor 810, or specifically as an interface with the software stored in the memory 812 or in the drive unit 814. Alternatively, it is contemplated that the hardware 800 can output signals to a remote display or computer, such as via an Intranet or the Internet.

Additionally, hardware 800 may include an input device 806 configured to allow a user to interact with any of the components of hardware. The input device 806 may be a number pad, a keyboard, or a cursor control device, such as a mouse, or a joystick, touch screen display, remote control or any other device operative to interact with the hardware 800.

Hardware 800 may also include a disk or optical drive unit 814. The drive unit 814 may include a computer readable medium (or a storage medium) 818 in which one or more sets of instructions 816, e.g. software, can be embedded. Further, the instructions 816 may embody one or more of the methods or logic as described. In a particular example, the instructions 816 may reside completely, or at least partially, within the memory 812 or within the processor 810 during execution. The memory 812 and the processor 810 also may include computer-readable media as discussed above.

The present invention contemplates a computer-readable medium 818 that includes instructions 816 or receives and executes instructions 816 responsive to a propagated signal so that a device connected to a network can communicate which includes voice, video, audio, images or any other data over a network. Further, the instructions 816 may be transmitted or received over the network via a communication port or interface 808 or using a bus 802. The communication port or interface 808 may be a part of the processor 810 or may be a separate component. The communication port 808 may be created in software or may be a physical connection in hardware. The communication port 808 may be configured to connect with a network, an external media, the display 804, or any other components, or combinations thereof.

The connection with the network may be a physical connection, such as a wired Ethernet connection or may be established wirelessly as discussed later. Likewise, the additional connections with other components of the hardware 800 may be physical connections or may be established wirelessly. The network may alternatively be directly connected to the bus 802.

The network may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more nonvolatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for electronically identifying changes between first and second piping models, comprising:
   providing, by a controller device, access to a comparison engine configured to receive first and second piping models, wherein each of the first and second piping models comprises a plurality of component objects;
   comparing, by the controller device, parameters of each of the plurality of component objects in the second piping model with parameters of the plurality of component objects in the first piping model using the comparison engine to identify a set of component objects in the second piping model each having at least one modified parameter;
   analyzing, by the controller device, each of the modified parameters using an analysis engine coupled to a database of stored parameter ranges for a plurality of stored component objects;
   wherein the analysis engine is configured to (a) match each component object of the set of component objects with a stored component object, (b) compare the modified parameters of that component object with the one or more stored parameter ranges of the matched stored component object for each component object of the set of component objects, and (c) associate a priority value with each of the set of component objects using one or more algorithms as a function of a difference between the modified parameter and the stored parameter range; and
   configuring, by the controller device, a pipe model interface to present a subset of the set of component objects, wherein each of the component objects of the subset have a priority value greater than a threshold value, wherein the step of configuring the pipe model interface includes configuring, by the controller device, the pipe model interface to present, on a display unit of the controller device, the subset as a graphical overlay on the second piping model as a function of the priority values.

2. The method of claim 1, wherein the parameters of the component objects comprise values associated with at least one of a line number, pipe size, pipe specification, bends, flanges, valves, tees, pressure case, temperature case, and a location.

3. The method of claim 1, wherein the stored component object comprises a historical component object.

4. The method of claim 3, further comprising determining, by the controller device, the threshold value using the analysis engine as a function of at least one of a historical priority value associated with the historical component object and a historical threshold value stored in a historical model database.

5. The method of claim 1, wherein the step of configuring the pipe model interface further comprises configuring the pipe model interface to allow for modifications of the threshold value by a user.

6. The method of claim 1, wherein the threshold value comprises an industry standard value.

7. The method of claim 1, wherein the graphical overlay visually distinguishes component objects of the subset having a higher priority value from those component objects having a lower priority value.

8. The method of claim 7, wherein the component objects of the subset having a higher priority value are visually distinguished from those component objects having a lower priority value on the display unit by color, emphasis, or size.

9. The method of claim 1, wherein the step of configuring the pipe model interface further comprises configuring, by the controller device, the pipe model interface to present a list of the subset of component objects to a user.

10. The method of claim 1, further comprising alerting a user when the priority value of a component object of the subset is greater than a second threshold value.

11. The method of claim 1, further comprising:
   generating, by the controller device, a set of recommendations for a user based on the one or more algorithms as a function of the difference between the modified parameter and the stored parameter range; and
   configuring, by the controller device, the pipe model interface to present the set of recommendations.

* * * * *